United States Patent
Terada et al.

(10) Patent No.: US 9,951,202 B2
(45) Date of Patent: *Apr. 24, 2018

(54) POLYAMIDE RESIN COMPOSITION AND MOLDED ARTICLE

(71) Applicant: ASAHI KASEI KABUSHIKI KAISHA, Tokyo (JP)

(72) Inventors: Kazunori Terada, Tokyo (JP); Teruaki Sakuma, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,755

(22) Filed: Oct. 14, 2015

(65) Prior Publication Data

US 2016/0108208 A1 Apr. 21, 2016

(30) Foreign Application Priority Data

Oct. 15, 2014 (JP) .................................. 2014-211037

(51) Int. Cl.
| | | |
|---|---|---|
| C08K 5/20 | (2006.01) | |
| C08K 5/098 | (2006.01) | |
| C08K 5/103 | (2006.01) | |
| C08K 3/16 | (2006.01) | |

(52) U.S. Cl.
CPC ............... *C08K 5/20* (2013.01); *C08K 3/16* (2013.01); *C08K 5/098* (2013.01); *C08K 5/103* (2013.01)

(58) Field of Classification Search
CPC .......... C08K 5/20; C08K 5/098; C08K 5/103; C08K 3/16
See application file for complete search history.

(56) References Cited

U.S. PATENT DOCUMENTS

| | | | | |
|---|---|---|---|---|
| 2006/0291215 | A1* | 12/2006 | Shirai | B29C 45/0001 362/341 |
| 2013/0059962 | A1* | 3/2013 | Terada | C08J 3/226 524/431 |
| 2013/0072616 | A1 | 3/2013 | Peduto | |
| 2013/0165567 | A1* | 6/2013 | Benighaus | C08K 5/0008 524/210 |
| 2014/0288220 | A1* | 9/2014 | Duncan | C08K 3/22 524/133 |
| 2015/0175744 | A1* | 6/2015 | Ieda | C08G 69/265 524/494 |

FOREIGN PATENT DOCUMENTS

| | | | | |
|---|---|---|---|---|
| JP | 7-18176 | | 1/1995 | |
| JP | 2006-96802 | | 4/2006 | |
| JP | 2010-270327 | | 12/2010 | |
| JP | 2011-511097 | | 4/2011 | |
| JP | 2012-184306 | | 9/2012 | |
| WO | WO 2001/064791 | * | 2/2001 | ............ B29C 49/00 |
| WO | 2013/143858 | | 10/2013 | |

OTHER PUBLICATIONS

"Production and Application of Fine Chemical Products of Nonferrous Metals" with English Translation, pp. 166-167.

* cited by examiner

*Primary Examiner* — John E Uselding
(74) *Attorney, Agent, or Firm* — Greenblum & Bernstein, P.L.C.

(57) ABSTRACT

A polyamide resin composition including a polyamide resin (A), a copper compound (B), a bromide of an alkali metal and/or a bromide of an alkaline earth metal (C), and at least one fatty acid compound (D) selected from the group consisting of fatty acid esters, fatty acid amides, and fatty acid metal salts, wherein the fatty acid compound (D) has an acid value of 5 mgKOH/g or less.

14 Claims, No Drawings

POLYAMIDE RESIN COMPOSITION AND MOLDED ARTICLE

BACKGROUND OF THE INVENTION

Field of the Invention

The present invention relates to polyamide resin compositions and molded articles.

Description of the Related Art

Polyamide resins have high mechanical properties (such as mechanical strength, rigidity, and impact resistance), toughness, heat resistance, and chemical resistance, and have been used in various industrial fields such as clothing materials, industrial materials, vehicles, and electrical and electronic apparatuses and devices, and other industrial fields.

In particular, polyamide resins have higher heat aging resistance than that of other resins, and are suitably used as materials for parts which receive a significantly large amount of heat, such as parts for engine compartments of vehicles.

The environmental temperatures inside the engine compartments of vehicles have been increased recently in connection with higher density of parts for engine compartments of vehicles and higher outputs of engines. For this reason, a polyamide resin which can maintain significantly higher heat aging resistance for a longer period of time than those of the traditional polyamide resins has been required.

One of the traditional techniques of enhancing the heat aging resistance of the polyamide resins is addition of a copper compound (oxide or salt of copper) and a halogen compound.

Among the halogen compounds, an iodine compound is typically added. A technique of compounding a polyamide resin, a copper compound, an iodine compound, and an aliphatic carboxylic derivative is known (for example, see Japanese Patent Laid-Open No. 7-18176).

Unfortunately, iodine as a resource is mined from the ground, and its efficient mining areas are limited. These have been increasing the cost of iodine compounds recently, and thus use of iodine compounds in polyamide resins has a problem of increased production cost.

In contrast, bromine as a resource can be extracted from sea water or the like, and is more inexpensive and industrially useful than iodine. For this reason, other techniques of adding a bromine compound rather than an iodine compound have been developed to enhance the heat aging resistance of the polyamide resin (for example, see International Publication No. WO 2013-143858 and National Publication of International Patent Application No. 2011-511097).

Unfortunately, bromine compounds are more readily corrode metals than iodine compounds. If polyamide resin compositions containing a bromine compound are used as materials for parts for engine compartments of vehicles and the like, there is a concern that the bromine compound may corrode metallic parts of processing machines such as extruders and molding machines, therefore the conditions on usage and the like should be considered. Accordingly, a polyamide resin composition which causes less corrosion of metal than before has been required.

An object of the present invention is to provide a polyamide resin composition which has high heat aging resistance, and is less likely to cause corrosion of metal and deposition of copper.

SUMMARY OF THE INVENTION

The present inventors, who have conducted extensive research to solve the problems, have found that the problems can be solved by a polyamide resin composition comprising a polyamide resin, a copper compound, a bromide of an alkali metal and/or a bromide of an alkaline earth metal, and a fatty acid compound having a predetermined acid value, and have completed the present invention.

Namely, the present invention is as follows:

[1]

A polyamide resin composition comprising:
a polyamide resin (A),
a copper compound (B),
a bromide of an alkali metal and/or a bromide of an alkaline earth metal (C), and
one or more fatty acid compound (D) selected from the group consisting of fatty acid esters, fatty acid amides, and fatty acid metal salts,
wherein the fatty acid compound (D) has an acid value of 5 mgKOH/g or less.

[2]

The polyamide resin composition according to [1], wherein the polyamide resin (A) contains terminal carboxyl group at a concentration of 50 µmol/g or more.

[3]

The polyamide resin composition according to [1] or [2], wherein the copper compound (B) is a copper halide compound.

[4]

The polyamide resin composition according to any one of [1] to [3], wherein a molar ratio of a halogen element to a copper element in the polyamide resin composition is 2/1 to 50/1.

[5]

The polyamide resin composition according to any one of [1] to [4], wherein the fatty acid compound (D) has a melting point of 110 to 150° C.

[6]

The polyamide resin composition according to any one of [1] to [5], wherein the fatty acid compound (D) is a fatty acid metal salt with a metal content of 3.5 to 11.5% by mass.

[7]

The polyamide resin composition according to any one of [1] to [6], wherein the polyamide resin composition contains 0.005% by mass or more of a copper element based on 100% by mass of the polyamide resin composition.

[8]

The polyamide resin composition according to any one of [1] to [7], wherein a mass ratio of the bromide of an alkali metal and/or bromide of an alkaline earth metal (C) to the fatty acid compound (D) in the polyamide resin composition is 2/1 to 1/10.

[9]

The polyamide resin composition according to any one of [1] to [8], further comprising an inorganic filler (E).

[10]

The polyamide resin composition according to any one of [1] to [9], wherein a copper element is not deposited on a surface of rolled steel (SS400) after the polyamide resin composition is in contact with the rolled steel at a temperature 30° C. higher than the melting point of the polyamide resin (A) for 5 hours.

[11]

A molded article comprising the polyamide resin composition according to any one of [1] to [10].

[12]

The molded article according to [11], wherein the molded article is a vehicle part.

The present invention can provide a polyamide resin composition which has high heat aging resistance, and is less likely to cause corrosion of metal and deposition of copper.

DETAILED DESCRIPTION OF THE PREFERRED EMBODIMENT

An embodiment for implementing the present invention (hereinafter referred to as "the present embodiment") will now be described in detail.

The present embodiment described below is only an example for describing the present invention. The present invention will not be limited to the embodiment, and can be modified in various ways within the gist and implemented.
Polyamide Resin Composition The polyamide resin composition according to the present embodiment comprises:

a polyamide resin (A), a copper compound (B), a bromide of an alkali metal and/or a bromide of an alkaline earth metal (C), and one or more fatty acid compound (D) selected from the group consisting of fatty acid esters, fatty acid amides, and fatty acid metal salts, wherein the fatty acid compound (D) has an acid value of 5 mgKOH/g or less.

The components of the polyamide resin composition will now be described in detail.
Polyamide Resin (A)

The polyamide resin composition according to the present embodiment comprises a polyamide resin (A) (hereinafter referred to as component (A) in some cases). The polyamide resin indicates a polymer having a —CO—NH— (amide) bond in the main chain.

Examples of the polyamide resin (A) include, but not limited to, polyamide resins prepared through ring-opening polymerization of lactam, polyamide resins prepared through self-condensation of ω-aminocarboxylic acid, polyamide resins prepared through condensation of diamine and dicarboxylic acid, and copolymerization products thereof.

These polyamide resins can be used alone, or can be used in combination in the form of a mixture.

The raw materials for the polyamide resin (A) will now be described.

Examples of the lactam as a monomer, component of the polyamide resin include, but not limited to, pyrrolidone, caprolactam, undecalactam, and dodecalactam.

Examples of the ω-aminocarboxylic acid include, but not limited to, ω-amino fatty acids which are open-ring compounds of the lactam with water.

These lactams and ω-aminocarboxylic acids each can be used singly or in combinations of two or more.

The polyamide resins prepared through condensation of diamine and dicarboxylic acid will now be described.

Examples of the diamine (monomer) include, but not limited to, linear aliphatic diamines such as hexamethylenediamine and pentamethylenediamine; branched aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine.

Examples of the dicarboxylic acid (monomer) include, but not limited to, aliphatic dicarboxylic acids such as adipic acid, pimelic acid, and sebacic acid; aromatic dicarboxylic acids such as phthalic acid and isophthalic acid; and alicyclic dicarboxylic acids such as cyclohexanedicarboxylic acid.

These diamine and dicarboxylic acid as a monomer each can be used singly or in combinations of two or more.

Examples of the polyamide resin (A) include, but not limited to, polyamide 4 (poly α-pyrrolidone), polyamide 6 (polycaproamide), polyamide 11 (polyundecamide), polyamide 12 (polydodecamide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), and polyamide 6I (polyhexamethylene isophthalamide), and copolymerized polyamides comprising these polyamides as a component.

These polyamide resins can be used singly or in combinations of two or more.

Among these polyamide resins listed above, more preferred are polyamide resins having a melting point of 200° C. or more to enhance the heat resistance. Examples of the polyamide resins having a melting point of 200° C. or more include, but not limited to, polyamide 6, polyamide 66, polyamide 610, polyamide 612, polyamide 46, polyamide 6T, polyamide 6I, polyamide 9T, and one or more copolymerized polyamides selected from the group consisting of copolymerized polyamides comprising these polyamides as a component.

The melting point of the polyamide resin indicates a melting point determined by differential scanning calorimetry (DSC) in accordance with JIS K7121.

The ratio of the number of carbon atoms to the number of nitrogen atoms (ratio C/N) in the polymer chain of the polyamide resin (A) is preferably more than 5 from the viewpoint of the heat aging resistance. The ratio of the number of carbon atoms to the number of nitrogen atoms (ratio C/N) is more preferably more than 5 and 15 or less, still more preferably more than 5 and 12 or less.

Examples of the copolymerized polyamide include, but not limited to, one or more copolymerization products selected from the group consisting of a copolymerization product of hexamethylene adipamide and hexamethylene terephthalamide, a copolymerization product of hexamethylene adipamide and hexamethylene isophthalamide, and a copolymerization product of hexamethylene terephthalamide and 2-methylpentanediamine terephthalamide.

The polyamide resin (A) typically has a terminal amino or carboxyl group. The content ratio of the terminal groups in the polyamide resin (A), i.e., content of amino group/content of carboxyl group is preferably 9/1 to 1/9, more preferably 6/4 to 1/9, still more preferably 5/5 to 1/9. A content ratio of the terminal groups within this range tends to be able to more significantly enhance the mechanical strength of the polyamide resin composition according to the present embodiment.

The content of the terminal amino group in the polyamide resin (A) is preferably 10 to 100 μmol/g, more preferably 15 to 80 μmol/g, still more preferably 30 to 80 μmol/g. A content of the terminal amino group in the polyamide resin (A) within this range tends to be able to more significantly enhance the mechanical strength of the polyamide resin composition according to the present embodiment.

The content of the terminal carboxyl group in the polyamide resin (A) is preferably 20 μmol/g or more, more preferably 50 μmol/g or more, still more preferably 50 to 120 μmol/g, further still more preferably 50 to 100 μmol/g. A content of the terminal carboxyl group in the polyamide resin (A) within this range tends to be able to more significantly enhance the heat aging resistance of the polyamide resin composition according to the present embodiment.

Throughout the specification, the contents of the terminal amino group and the terminal carboxyl group in the polyamide resin (A) can be determined from the integrated values of characteristic signals corresponding to the respective terminal groups, which are obtained by $^1$H-NMR.

The contents of the terminal groups in the polyamide resin (A) can be adjusted by known methods. Examples of such methods of adjusting the contents of the terminal groups include, but not limited to, a method using a terminal adjuster.

Specifically, the contents of the terminal groups in the polyamide resin (A) can be adjusted through addition of one or more compounds selected from the group consisting of monoamine compounds, diamine compounds, monocarboxylic acid compounds, and dicarboxylic acid compounds during polymerization of the polyamide resin so as to attain predetermined contents of the terminal groups.

These compounds, if functioning as a terminal adjuster, can be added to the polymerization solvent at any timing, for example, at a timing where the raw materials for the polyamide resin (A) are added to the polymerization solvent.

Examples of the monoamine compounds include, but not limited to, aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and any mixtures thereof.

These monoamine compounds can be used singly or in combinations of two or more.

Particularly from the viewpoints of the reactivity, the boiling point, the stability of terminals, and the price, preferred are one or more monoamine compounds selected from the group consisting of butylamine, hexylamine, octylamine, decylamine, stearylamine, cyclohexylamine, and aniline.

Examples of the diamine compounds include, but not limited to, linear aliphatic diamines such as hexamethylenediamine and pentamethylenediamine; branched aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine.

These diamine compounds can be used singly or in combinations of two or more.

Examples of the monocarboxylic acid compounds include, but not limited to, aliphatic monocarboxylic acids such as acetic acid, propionic acid, butyric acid, valeric acid, caproic acid, caprylic acid, lauric acid, tridecylic acid, myristyl acid, palmitic acid, stearic acid, pivalic acid and isobutyric acid; alicyclic monocarboxylic acid such as cyclohexane carboxylic acid; and aromatic monocarboxylic acids such as benzoic acid, toluic acid, α-naphthalenecarboxylic acid, β-naphthalenecarboxylic acid, methylnaphthalene carboxylic acid, and phenylacetic acid.

These monocarboxylic acid compounds can be used singly or in combinations of two or more.

Examples of the dicarboxylic acid compounds include, but not limited to, aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; alicyclic dicarboxylic acids such as 1,3-cyclopentane dicarboxylic acid and 1,4-cyclohexane dicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4,4'-dicarboxylic acid, and 4,4'-biphenyldicarboxylic acid.

These dicarboxylic acid compounds can be used singly or in combinations of two or more.

The content of the polyamide resin (A) in the polyamide resin composition according to the present embodiment is preferably 30 to 99.94% by mass, more preferably 40 to 99.94% by mass, still more preferably 40 to 99.89% by mass to enhance the molding properties and the mechanical strength.

Copper Compound (B)

The polyamide resin composition according to the present embodiment comprises a copper compound (B) (hereinafter also referred to as component (B) in some cases).

Examples of the copper compound (B) include, but not limited to, copper halides (such as copper iodide, cuprous bromide, cupric bromide, and cuprous chloride), copper acetate, copper propionate, copper benzoate, copper adipate, copper terephthalate, copper isophthalate, copper salicylate, copper nicotinate, copper stearate, and copper complex salts having copper coordinated with a chelating agent such as ethylenediamine or ethylenediaminetetraacetic acid.

These copper compounds can be used singly or in combinations of two or more.

Among these copper compounds (B) listed above, preferred are one or more compounds selected from the group consisting of copper halides (such as copper iodide, cuprous bromide, cupric bromide, and cuprous chloride) and copper acetate, more preferred are copper halides, and still more preferred are copper iodide and/or cuprous bromide. Use of these copper compounds tends to attain a polyamide resin composition which has high heat aging resistance and is less likely to cause corrosion of metal in screws and cylinders during extrusion (hereinafter simply referred to as "corrosion of metal").

The content of the copper compound (B) in the polyamide resin composition according to the present embodiment is preferably 0.001 to 0.2% by mass, more preferably 0.005 to 0.15% by mass, still more preferably 0.01 to 0.1% by mass based on 100% by mass of the polyamide resin composition.

If the content of the copper compound (B) in the polyamide resin composition is within this range, the heat aging resistance tends to be able to be more significantly enhanced, and deposition of copper and corrosion of metal tends to be able to be effectively reduced.

The content of the copper element in the polyamide resin composition is preferably 0.001% by mass or more, more preferably 0.005% by mass or more, still more preferably 0.005 to 0.05% by mass, further still more preferably 0.007 to 0.03% by mass based on 100% by mass of the polyamide resin composition to enhance the heat aging resistance of the polyamide resin composition.

Bromide of Alkali Metal and/or Bromide of Alkaline Earth Metal (C)

The polyamide resin composition according to the present embodiment comprises a bromide of an alkali metal and/or a bromide of an alkaline earth metal (C) (hereinafter referred to as component (C) in some cases).

Examples of the bromide of an alkali metal and/or bromide of an alkaline earth metal (C) include, but not limited to, potassium bromide, sodium bromide, lithium bromide, calcium bromide, magnesium bromide, and mixtures thereof.

In particular, preferred are potassium bromide and/or sodium bromide, more preferred is potassium bromide to enhance the heat aging resistance of the polyamide resin composition according to the present embodiment and reduce corrosion of metal caused by the polyamide resin composition according to the present embodiment.

The content of the bromide of an alkali metal and/or bromide of an alkaline earth metal (C) in the polyamide resin composition according to the present embodiment is preferably 0.05 to 5% by mass, more preferably 0.1 to 2% by mass, still more preferably 0.1 to 0.5% by mass based on 100% by mass of the polyamide resin composition.

If the content of the bromide of an alkali metal and/or bromide of an alkaline earth metal (C) is within this range, the heat aging resistance of the polyamide resin composition tends to be able to be more significantly enhanced, and deposition of copper and corrosion of metal tends to be able to be effectively reduced.

The copper compound (B) and the bromide of an alkali metal and/or bromide of an alkaline earth metal (C) are preferably contained in the polyamide resin composition according to the present embodiment at a molar ratio of the halogen element to the copper element (halogen element/copper element) of preferably 2/1 to 50/1, more preferably 5/1 to 30/1, still more preferably 5/1 to 20/1.

If the content ratio (halogen element/copper element) is within this range, the heat aging resistance of the polyamide resin composition according to the present embodiment tends to be able to be more significantly enhanced.

Throughout the specification, the halogen element indicates the total of a halogen element derived from a copper halide, if the copper compound (B) is the copper halide, and a bromine element derived from the bromide of an alkali metal and/or bromide of an alkaline earth metal (C).

A molar ratio of the halogen element to the copper element (halogen element/copper element) of 2/1 or more tends to reduce deposition of copper and corrosion of metal effectively in the polyamide resin composition according to the present embodiment.

If the molar ratio (halogen element/copper element) is 50/1 or less, corrosion of screws and the like in molding machines tends to be able to be prevented without essentially impairing mechanical properties, such as toughness, of the polyamide resin composition according to the present embodiment.

Fatty Acid Compound (D)

The polyamide resin composition according to the present embodiment contains one or more fatty acid compounds (D) selected from the group consisting of fatty acid esters, fatty acid amides, and fatty acid metal salts (hereinafter referred to as fatty acid compound (D) or component (D) in some cases) to more significantly enhance the heat aging resistance.

These fatty acid compounds (D) can be used singly or in combinations of two or more.

Examples of fatty acids constituting the fatty acid compound (D) include aliphatic monocarboxylic acids. In particular, preferred are fatty acids having 8 or more carbon atoms, and more preferred are fatty acids having 8 to 40 carbon atoms.

Examples of the fatty acids include, but not limited to, saturated or unsaturated, linear or branched aliphatic monocarboxylic acids.

Examples of the fatty acids include, but not limited to, stearic acid, palmitic acid, behenic acid, erucic acid, oleic acid, lauric acid, and montanic acid.

The fatty acid esters are ester compounds of the fatty acids and alcohols.

Examples of the alcohol include, but not limited to, 1,3-butanediol, trimethylolpropane, stearyl alcohol, behenyl alcohol, and lauryl alcohol.

Examples of the fatty acid esters include, but not limited to, stearyl stearate, behenyl behenate, montanic acid-1,3-butanediol ester, montanic acid-trimethylolpropane ester, trimethylolpropane trilaurate, and butyl stearate.

The fatty acid amides are amidated products of the fatty acids.

Examples of the fatty acid amides include, but not limited to, stearamide, oleamide, erucamide, ethylenebisstearylamide, ethylenebisoleylamide, N-stearylstearylamide, and N-stearylerucamide. In particular, preferred are stearamide, erucamide, ethylenebisstearylamide, and N-stearylerucamide, and more preferred are ethylenebisstearylamide and N-stearylerucamide.

The fatty acid metal salts are metal salts of the fatty acids.

Examples of metal elements forming salts with the fatty acids include Group I elements (alkali metals), Group II elements (alkaline earth metals), Group III elements in the periodic table, zinc, and aluminum.

The metal elements are preferably alkali metals such as sodium and potassium, alkaline earth metals such as calcium and magnesium, and aluminum.

Examples of the fatty acid metal salts include, but not limited to, higher fatty acid salts such as calcium stearate, aluminum stearate, zinc stearate, magnesium stearate, calcium montanate, sodium montanate, aluminum montanate, zinc montanate, magnesium montanate, calcium behenate, sodium behenate, zinc behenate, calcium laurate, zinc laurate, and calcium palmitate. Throughout the specification, higher fatty acids indicate fatty acids having more than 10 carbon atoms.

The fatty acid metal salts suitably used are metal montanates, metal behenates, and metal stearates. In particular, preferred are calcium stearate, aluminum stearate, zinc stearate, magnesium stearate, calcium montanate, zinc montanate, magnesium montanate, calcium behenate, and zinc behenate, more preferred are aluminum stearate, zinc stearate, magnesium stearate, calcium montanate, zinc montanate, calcium behenate, and zinc behenate, and still more preferred are calcium montanate, zinc montanate, and zinc behenate.

These fatty acid metal salts can be used singly or in combinations of two or more.

The metal content in the fatty acid metal salt is preferably 3.5 to 11.5% by mass based on 100% by mass of the fatty acid metal salt to reduce corrosion of metal and deposition of copper caused by the polyamide resin composition and attain the appearance and the releasing properties thereof. The metal content in the fatty acid metal salt is more preferably 3.5 to 10.0% by mass, still more preferably 4.0 to 9.0% by mass.

The fatty acid compound (D) has an acid value determined in accordance with JIS K 0070 (the number of milligrams of potassium hydroxide needed to neutralize free fatty acids and resin acids in a sample (1 g)) of 5 mgKOH/g or less to reduce corrosion of metal and deposition of copper caused by the polyamide resin composition according to the present embodiment. The acid value of the fatty acid compound (D) is preferably 0.01 to 5 mgKOH/g, more preferably 0.01 to 3 mgKOH/g, further preferably 0.01 to 1 mgKOH/g.

Preferred fatty acid compounds (D) are fatty acid amides and fatty acid metal salts to attain higher molding properties, and particularly, more preferred are fatty acid metal salts to attain a better appearance and higher releasing properties of the polyamide resin composition according to the present embodiment.

The melting point of the fatty acid compound (D) is preferably 110 to 150° C., more preferably 115 to 145° C., still more preferably 115 to 140° C. to attain a better appearance and higher releasing properties of the polyamide resin composition according to the present embodiment.

The melting point of the fatty acid compound (D) can be determined by differential scanning calorimetry (DSC) and the like.

The content of the fatty acid compound (D) in the polyamide resin composition according to the present embodiment is preferably 0.01 to 10% by mass, more preferably 0.03 to 5% by mass, still more preferably 0.05 to 2% by mass based on 100% by mass of the polyamide resin composition.

A content of the fatty acid compound (D) within this range tends to attain a polyamide resin composition having a better appearance, higher releasing properties, higher mechanical strength, and higher plasticity.

The content ration of the bromide of an alkali metal and/or bromide of an alkaline earth metal (C) to the fatty acid compound (D) in the polyamide resin composition according to the present embodiment in terms of mass ratio (component (C)/component (D)) is preferably 2/1 to 1/10, more preferably 2/1 to 1/5, still more preferably 1/1 to 1/5, further still more preferably 1/1 to 1/3.

If the mass ratio (component (C)/component (D)) is within this range, the heat aging resistance of the polyamide resin composition according to the present embodiment tends to be able to be more significantly enhanced, and corrosion of metal and deposition of copper tends to be able to be more significantly reduced.

Other Components which May be Contained in the Polyamide Resin Composition

In the present embodiment, the polyamide resin composition may further contain an inorganic filler (E) (hereinafter referred to as component (E) in some cases) in addition to the components (A) to (D).

Examples of the inorganic filler (E) include, but not limited to, glass fibers, carbon fibers, calcium silicate fibers, potassium titanate fibers, aluminum borate fibers, flake glass, talc, kaolin, mica, hydrotalcite, calcium carbonate, zinc carbonate, zinc oxide, monohydrogen calcium phosphate, wollastonite, silica, zeolite, alumina, boehmite, aluminum hydroxide, titanium oxide, silicon oxide, magnesium oxide, calcium silicate, sodium aluminosilicate, magnesium silicate, ketjen black, acetylene black, furnace black, carbon nanotube, graphite, brass, copper, silver, aluminum, nickel, iron, calcium fluoride, mica, montmorillonite, swellable fluorine mica, and apatite.

These inorganic fillers can be used singly or in combinations of two or more.

Among these inorganic fillers (E) listed above, preferred are one or more inorganic fillers selected from the group consisting of glass fibers, carbon fibers, flake glass, talc, kaolin, mica, calcium carbonate, monohydrogen calcium phosphate, wollastonite, silica, carbon nanotube, graphite, calcium fluoride, montmorillonite, swellable fluorine mica, and apatite to enhance the mechanical strength and the rigidity of the polyamide resin composition according to the present embodiment. More preferred inorganic fillers (E) are one or more inorganic fillers selected from the group consisting of glass fibers, carbon fibers, wollastonite, talc, mica, kaolin, and silicon nitride.

The glass fibers and the carbon fibers in the polyamide resin composition preferably have a number average fiber diameter of 3 to 30 μm, a weight average fiber length of 100 to 750 μm, and an aspect ratio of the weight average fiber length to the number average fiber diameter (value obtained by dividing the weight average fiber length by the number average fiber diameter) of 10 to 100 to attain a polyamide resin composition having high mechanical properties.

The wollastonite in the polyamide resin composition preferably have a number average fiber diameter of 3 to 30 μm, a weight average fiber length of 10 to 500 μm, and an aspect ratio of 3 to 100 to attain a polyamide resin composition having high mechanical properties.

The talc, mica, kaolin, and silicon nitride in the polyamide resin composition preferably have a number average particle diameter of 0.1 to 10 μm to attain a polyamide resin composition having high mechanical properties.

Throughout the specification, the number average fiber diameter, the number average particle diameter, and the weight average fiber length can be determined by the following methods.

A polyamide resin composition is placed in an electric furnace to burn organic substances contained in the resin composition. For example, more than 100 inorganic fillers are arbitrarily selected from the residue, and are observed with a scanning electron microscope (SEM) to determine the fiber diameters and the particle diameters of these inorganic fillers, and in turn the number average fiber diameter and the number average particle diameter. The fiber lengths are measured with an SEM photograph at a magnification of 1000 times to determine the weight average fiber length.

The inorganic filler (E) may be subjected to a surface treatment with a silane coupling agent.

Examples of the silane coupling agent include, but not limited to, aminosilanes such as γ-aminopropyltriethoxysilane, γ-aminopropyltrimethoxysilane and N-β-(aminoethyl)-γ-aminopropylmethyldimethoxysilane; mercaptosilanes such as γ-mercaptopropyltrimethoxysilane and γ-mercaptopropyltriethoxysilane; expoxysilanes; and vinylsilanes.

The inorganic filler is preferably one or more inorganic fillers selected from the group above. More preferred are aminosilanes.

The glass fibers and the carbon fibers may further contain a sizing agent such as copolymers comprising a carboxylic anhydride-containing unsaturated vinyl monomer and an unsaturated vinyl monomer excluding the carboxylic anhydride-containing unsaturated vinyl monomer as structural units, epoxy compounds, polycarbodiimide compounds, polyurethane resins, homopolymers of acrylic acid, copolymers of acrylic acid and other copolymerizable monomers, and salts of primary, secondary, and tertiary amines thereof. These can be used singly or in combinations of two or more.

The glass fibers and the carbon fibers containing the sizing agent can be prepared in a known step of preparing glass or carbon fibers by continuously reacting the sizing agent with glass or carbon fibers.

Specifically, the glass fibers and the carbon fibers containing the sizing agent can be prepared as follows: The sizing agent is applied onto glass or carbon fibers with a known method such as a roller type applicator to prepare fiber strands, and the fiber strands are dried.

The fiber strands may be used as it is in the form of a roving, or may be cut into chopped glass strands for use.

The sizing agent is applied (added) to the glass or carbon fibers (100% by mass) in a solid content of preferably 0.2 to 3% by mass, more preferably 0.3 to 2% by mass.

The solid content in the sizing agent to be added is preferably 0.2% by mass or more based on 100% by mass of the glass or carbon fibers to maintain sizing of the glass or carbon fibers. The amount of the sizing agent to be added in terms of the solid content is preferably 3% by mass or less to enhance the thermal stability of the polyamide resin composition according to the present embodiment. The strands may be dried after the cutting step, or may be cut after drying the strands.

The content of the inorganic filler (E) in the polyamide resin composition according to the present embodiment is preferably 10 to 70% by mass, more preferably 15 to 65% by mass, still more preferably 20 to 65% by mass to enhance the molding properties and the mechanical strength.

The polyamide resin composition according to the present embodiment may further contain other components when necessary, in addition to the components (A) to (E), within the range not impairing advantageous effects of the present invention.

Examples of the other components include, but not limited to, antioxidants, ultraviolet absorbing agents, heat stabilizers, photodegradation preventing agents, plasticizers, lubricants, mold release agents, nucleus agents, flame retardants, colorants, dyeing agents, and pigments. These components can be added to the polyamide resin composition, or can be mixed with other thermoplastic resins.

The other components each differ in nature, and their suitable contents of the components are varied. A person skilled in the art would determine the suitable contents of the other components.

Method of Preparing Polyamide Resin Composition

Examples of a method of preparing the polyamide resin composition according to the present embodiment include, but not limited to, a method of melting the polyamide resin (A) in a mono- or multi-axial extruder, and kneading the component (B), the component (C), and the component (D) with the melted polyamide resin (A).

If the inorganic filler (E) is used, a twin screw extruder provided with an upstream feeding port and a downstream feeding port is preferably used to feed the inorganic filler (E) from the downstream feeding port for melt kneading after feeding the polyamide resin (A), the component (B), the component (C), and the component (D) from the upstream feeding port and melting. If a roving of glass or carbon fibers is used, a composite product can be prepared by a known method.

Properties of Polyamide Resin Composition

It is preferred that the polyamide resin composition according to the present embodiment do not cause deposition of the copper element on the surface of rolled steel (SS400) after the polyamide resin composition is in contact with the rolled steel at a temperature 30° C. higher than the melting point of the polyamide resin (A) for 5 hours.

In the polyamide resin composition according to the present embodiment, deposition of copper can be effectively reduced through control of the acid value of the fatty acid compound (D) to be 5 mgKOH/g or less. In addition, deposition of copper tends to be able to be more effectively reduced through control of the polyamide resin (A) containing terminal carboxyl groups at a concentration of 50 μmol/g or more and a fatty acid metal salt used as the fatty acid compound (D) such that the metal content in the fatty acid metal salt is 3.5 to 11.5% by mass and the mass ratio (component (C)/component (D)) is within the range of 2/1 to 1/10.

Deposition of copper caused by the polyamide resin composition according to the present embodiment can be verified by a method described later in Examples.

Molded Article

The molded article according to the present embodiment comprises the polyamide resin composition according to the present embodiment and, for example, can be prepared through injection molding of the polyamide resin composition.

Applications

The molded article according to the present embodiment can be suitably used as various molded articles and parts, for example, for vehicles, industrial machines, electric and electronic apparatuses and devices, trade and industrial materials, and every day household goods.

EXAMPLES

The present invention will now be described in detail by way of specific Examples and Comparative Examples, but the present invention will not be limited to Examples below.

Methods for Evaluation

Examples and Comparative Examples were evaluated by the following methods.

Tensile Strength

Pellets of the polyamide resin compositions prepared in Examples and Comparative Examples were molded into multi-purpose test pieces (A type) with an injection molding machine (PS-40E: made by NISSEI PLASTIC INDUSTRIAL CO., LTD.) by a method in accordance with ISO 3167.

In molding, the time for injection and hold-pressure was set at 25 seconds, the cooling time at 15 seconds, the mold temperature at 80° C., and a melt resin temperature at 290° C.

The prepared multi-purpose test pieces (A type) were subjected to a tensile test at a tensile rate of 5 mm/min by a method in accordance with ISO 527 to determine the tensile strength (MPa).

Tensile Strength after Heat Aging

The multi-purpose test pieces (A type) prepared in the evaluation of tensile strength above were thermally aged in a hot air circulating oven at 150° C. for 2,000 hours.

These test pieces were cooled at 23° C. for 24 hours, and were subjected to a tensile test at a tensile rate of 5 mm/min by a method in accordance with ISO 527 to determine the tensile strength (MPa) after heat aging for 2,000 hours.

Corrosion of Metal

Pellets (20 g) of the polyamide resin compositions prepared in Examples and Comparative Examples were each placed in an autoclave made of SUS314 and having pressure resistance to 2.0 MPa and an inner volume of 100 mL. A rolled steel (SS400) test piece (10 mm×20 mm×2 mm) having a surface polished with a #2000 whetstone were then added, and additional pellets (20 g) of the polyamide resin composition were deposited over the rolled steel test piece.

The autoclave was purged with nitrogen, and was hermetically sealed. The polyamide resin compositions comprising polyamide resin PA66 were heated at 290° C., and those comprising polyamide resin PA6 were heated at 250° C. The heating time was 5 hours.

The autoclave was then cooled under running water to room temperature, and was opened.

The rolled steel test piece was extracted from the melt and solidified pellets of the polyamide resin compositions. The polyamide resin composition adhering to the surface of the rolled steel test piece was removed with hexafluoropropanol (HFIP). The mass of the rolled steel test piece was precisely weighed in order of 0.01 mg, and was divided by the predetermined mass of the rolled steel test piece before the test to determine the mass reduction rate in mass ppm.

Deposition of Copper

The surfaces of the rolled steel test pieces after the metal corrosion test were visually observed for deposition of the copper element, and were evaluated according to the following criteria:

Excellent: deposition of the copper element is not found.

Good: deposition of the copper element occupies less than 5% of the surface area of the rolled steel.

Fair: deposition of the copper element occupies 5% or more and less than 10% of the surface area of the rolled steel.

Poor: deposition of the copper element occupies 10% or more of the surface area of the rolled steel.

Preparation of Raw Materials

1. Polyamide Resin (1-1) Polyamide 66 (Hereinafter Abbreviated to "PA-1")

VN (sulfuric acid): 143 ml/g, terminal amino group: 48 mmol/kg, terminal carboxyl group: 79 mmol/kg (1-2) Polyamide 66 (Hereinafter Abbreviated to "PA-2")

VN (sulfuric acid): 140 ml/g, terminal amino group: 80 mmol/kg, terminal carboxyl group: 46 mmol/kg (1-3) Polyamide 6 (Hereinafter Abbreviated to "PA-3")

VN (sulfuric acid): 141 ml/g, terminal amino group: 45 mmol/kg, terminal carboxyl group: 82 mmol/kg 2. Copper Iodide (Hereinafter Abbreviated to "CuI")

A reagent made by Wako Pure Chemical Industries, Ltd. was used.

3. Potassium Bromide (Hereinafter Abbreviated to "KBr")

A reagent made by Wako Pure Chemical Industries, Ltd. was used.

4. Potassium Iodide (Hereinafter Abbreviated to "KI")

A reagent made by Wako Pure Chemical Industries, Ltd. was used.

5. Fatty Acid Compound (5-1) Calcium Montanate (Hereinafter Abbreviated to "MonCa-1")

Acid value: 0.8 mgKOH/g, melting point: 120° C.

(5-2) Calcium Montanate (Hereinafter Abbreviated to "MonCa-2")

Acid value: 6.5 mgKOH/g, melting point: 120° C.

(5-3) Montanic Acid-1,3-Butanediol Ester (Hereinafter Abbreviated to "MonEs")

Acid value: 15 mgKOH/g, melting point: 80° C.

(5-4) Ethylenebisstearylamide (Hereinafter Abbreviated to "EBS")

Acid value: 8 mgKOH/g, melting point: 140° C.

(5-5) Zinc Stearate (Hereinafter Abbreviated to "StZn")

Acid value: 0.5 mgKOH/g, melting point: 120° C.

(5-6) Aluminum Monostearate (Hereinafter Abbreviated to "StAl")

Acid value: 14 mgKOH/g, melting point: 170° C.

6. Glass Fiber (Hereinafter Abbreviated to "GF")

Trade name: ECS 03T-275H (made by Nippon Electric Glass Co., Ltd.) was used.

Examples 1 to 6 and Comparative Examples 1 to 8

A twin screw extruder ZSK-26MC made by Coperion GmbH (Germany) was used. The extruder had an upstream feeding port in the first barrel from the upstream of the extruder and had a downstream feeding port in the ninth barrel. The L/D (cylinder length of extruder/cylinder diameter of extruder) was 48 (the number of barrels: 12).

In the twin screw extruder, the temperature from the upstream feeding port to a die was set at 280° C., the screw rotations at 250 rpm, and the feeding rate at 25 kg/h.

Under such conditions, each of the polyamide resin (PA), CuI, KBr or KI, and the fatty acid compound were fed in a proportion shown in the upper column of Table 1 from the upstream feeding port.

In Example 6, GF was fed from the downstream feeding port.

These raw materials were melt kneaded to prepare pellets of the polyamide resin composition.

The pellets of the polyamide resin composition obtained were molded at the melt resin temperature and the mold temperature described above to evaluate the tensile strength, the tensile strength after heat aging, the corrosion of metal, and the deposition of copper.

The results of evaluation (measurements) are shown in Table 1 below.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| <Composition> | | | | | | | | | | |
| (A) Polyamide resin | PA - 1 | Parts by mass | 99.5 | 99.15 | 99.15 | | | 64.15 | 99.65 | 99.15 |
| | PA - 2 | Parts by mass | | | | 99.15 | | | | |
| | PA - 3 | Parts by mass | | | | | 99.15 | | | |
| (B) Copper iodide | CuI | Parts by mass | 0.03 | 0.05 | 0.05 | 0.05 | 0.05 | 0.05 | 0.05 | 0.05 |
| (C) Potassium bromide | KBr | Parts by mass | 0.17 | 0.3 | 0.3 | 0.3 | 0.3 | 0.3 | 0.3 | 0.3 |
| Potassium iodide | KI | Parts by mass | | | | | | | | |
| (D) Fatty acid compound | MonCa - 1 | Parts by mass | 0.3 | 0.5 | | | 0.5 | 0.5 | | |
| | MonCa - 2 | Parts by mass | | | | | | | | 0.5 |
| | MonEs | Parts by mass | | | | | | | | |

TABLE 1-continued

|  |  |  |  |  |  |  |  |  |  |
|---|---|---|---|---|---|---|---|---|---|
| | EBS | Parts by mass | | | | | | | |
| | StZn | Parts by mass | | | 0.5 | 0.5 | | | |
| | StAl | Parts by mass | | | | | | | |
| (E) Inorganic filler | GF | Parts by mass | | | | | | 35 | | |

<Physical properties>

| | | | | | | | | | |
|---|---|---|---|---|---|---|---|---|---|
| Tensile strength | | MPa | 87 | 87 | 86 | 84 | 80 | 210 | 82 | 85 |
| Tensile strength after heat aging | | MPa | 86 | 86 | 85 | 79 | 78 | 210 | 65 | 81 |
| Corrosion of metal | Mass reduction rate | ppm | 42 | 45 | 63 | 65 | 38 | 50 | 82 | 105 |
| Deposition of copper | | — | Excellent | Excellent | Excellent | Good | Excellent | Excellent | Good | Poor |

| | | | | Comparative Example 3 | Comparative Example 4 | Comparative Example 5 | Comparative Example 6 | Comparative Example 7 | Comparative Example 8 |
|---|---|---|---|---|---|---|---|---|---|
| <Composition> | | | | | | | | | |
| (A) Polyamide resin | PA - 1 | Parts by mass | | 99.15 | 99.15 | 99.15 | | 99.15 | 99.15 |
| | PA - 2 | Parts by mass | | | | | 99.15 | | |
| | PA - 3 | Parts by mass | | | | | | | |
| (B) Copper iodide | CuI | Parts by mass | | 0.05 | 0.05 | 0.05 | 0.05 | 0.05 | 0.05 |
| (C) Potassium bromide | KBr | Parts by mass | | 0.3 | 0.3 | 0.3 | 0.3 | | |
| Potassium iodide | KI | Parts by mass | | | | | | 0.3 | 0.3 |
| (D) Fatty acid compound | MonCa - 1 | Parts by mass | | | | | | 0.5 | |
| | MonCa - 2 | Parts by mass | | | | | | | |
| | MonEs | Parts by mass | | 0.5 | | | | | |
| | EBS | Parts by mass | | | 0.5 | | | | |
| | StZn | Parts by mass | | | | | | | |
| | StAl | Parts by mass | | | | 0.5 | 0.5 | | 0.5 |
| (E) Inorganic filler | GF | Parts by mass | | | | | | | |
| <Physical properties> | | | | | | | | | |
| Tensile strength | | MPa | | 83 | 84 | 84 | 82 | 85 | 85 |
| Tensile strength after heat aging | | MPa | | 80 | 80 | 80 | 75 | 72 | 72 |
| Corrosion of metal | Mass reduction rate | ppm | | 120 | 106 | 125 | 124 | 41 | 43 |
| Deposition of copper | | — | | Poor | Poor | Poor | Poor | Excellent | Excellent |

The results in Table 1 will be described.

Higher tensile strength indicates higher mechanical strength.

Higher tensile strength after heat aging indicates higher heat aging resistance in particular.

A smaller mass reduction rate in the metal corrosion test indicates that corrosion of metal is more effectively reduced.

Table 1 evidently show that in Examples 1 to 6, polyamide resin compositions having high heat aging resistance, causing less corrosion of metal and deposition of copper while having compatibility therebetween, and having high thermal stability were attained.

The results in Examples 1 to 6 evidently show that although the acid value was varied depending on the fatty acid compounds used, the fatty acid compounds having an acid value of 5 mgKOH/g or less attained high performance (in heat aging resistance, corrosion of metal, and deposition of copper) of the polyamide resin composition without essentially being affected by the difference in the acid value.

Comparative Example 1 not containing the fatty acid compound (D) evidently shows that the heat aging resistance was inferior.

Comparative Examples 2 to 6, in which the fatty acid compound (D) had an acid value of more than 5 mgKOH/g, evidently show that although the heat aging resistance was high, corrosion of metal and deposition of copper were inferior.

Comparison between Example 2 and Comparative Examples 5, 7, and 8 evidently shows that corrosion of metal and deposition of copper were not affected by the acid value of the fatty acid compound (D) to be added if potassium iodide was used whereas the heat aging resistance was significantly enhanced and corrosion of metal and deposition of copper were effectively reduced by addition of the fatty acid compound (D) having an acid value of 5 mgKOH/g or less if potassium bromide was used.

Accordingly, it turned out that the polyamide resin composition according to the present invention has high heat aging resistance, and is less likely to cause corrosion of metal and deposition of copper.

The polyamide resin composition according to the present invention is industrially applicable to a material for molded articles requiring high mechanical properties, such as vehicle parts and various electronic parts.

What is claimed is:

1. A polyamide resin composition comprising:
    a polyamide resin (A) at a content of 40 to 99.89% by mass based on 100% by mass of the polyamide resin composition,
    a copper halide compound (B) at a content of 0.01 to 0.1% by mass based on 100% by mass of the polyamide resin composition,
    a bromide of an alkali metal and/or a bromide of an alkaline earth metal (C) at a content of 0.17 to 0.5% by mass based on 100% by mass of the polyamide resin composition, and
    one or more fatty acid metal salts (D) selected from zinc stearate, magnesium stearate, calcium montanate, zinc montanate, calcium behenate, and zinc behenate,
    wherein the fatty acid metal salt (D) has an acid value of 5 mgKOH/g or less and is at a content of 0.05 to 2% by mass based on 100% by mass of the polyamide resin composition,
    wherein the mass ratio of the bromide of an alkali metal and/or bromide of an alkaline earth metal (C) to the fatty acid metal salt (D) in the polyamide resin composition is 1/1 to 1/3,
    wherein the polyamide resin (A) contains terminal carboxyl group at a concentration of 50 µmol/g or more, and
    with the proviso that the fatty acid metal salt (D) is not calcium stearate.

2. The polyamide resin composition according to claim 1, wherein a molar ratio of a halogen element to a copper element in the polyamide resin composition is 2/1 to 50/1.

3. The polyamide resin composition according to claim 1, wherein the fatty acid metal salt (D) has a melting point of 110 to 150° C.

4. The polyamide resin composition according to claim 1, wherein the fatty acid metal salt has a metal content of 3.5 to 11.5% by mass.

5. The polyamide resin composition according to claim 1, wherein the polyamide resin composition contains 0.005% by mass or more of a copper element based on 100% by mass of the polyamide resin composition.

6. The polyamide resin composition according to claim 1, further comprising an inorganic filler (E).

7. A molded article comprising the polyamide resin composition according to claim 1.

8. The molded article according to claim 7, wherein the molded article is a vehicle part.

9. The polyamide resin composition according to claim 2, wherein the fatty acid metal salt (D) has a melting point of 110 to 150° C.

10. The polyamide resin composition according to claim 2, wherein the fatty acid metal salt has a metal content of 3.5 to 11.5% by mass.

11. The polyamide resin composition according to claim 3, wherein the fatty acid metal salt has a metal content of 3.5 to 11.5% by mass.

12. The polyamide resin composition according to claim 9, wherein the fatty acid metal salt has a metal content of 3.5 to 11.5% by mass.

13. The polyamide resin composition according to claim 1, further comprising an inorganic filler (E).

14. The polyamide resin composition according to claim 3, further comprising an inorganic filler (E).

* * * * *